UNITED STATES PATENT OFFICE.

WILLIAM MORRISON, OF CHICAGO, ILLINOIS, ASSIGNOR, BY MESNE ASSIGNMENTS, TO EXMOOR STORAGE BATTERY COMPANY, OF CHICAGO, ILLINOIS, A CORPORATION OF ARIZONA TERRITORY.

PROCESS OF MAKING STORAGE-BATTERY PLATES.

No. 917,787.        Specification of Letters Patent.        Patented April 13, 1909.

Application filed January 12, 1905.    Serial No. 240,708.

*To all whom it may concern:*

Be it known that I, WILLIAM MORRISON, a citizen of the United States of America, and resident of Chicago, Cook county, Illinois, have invented a certain new and useful Improvement in Processes of Making Storage-Battery Plates, of which the following is a specification.

My invention relates to the preparation of storage battery plates, and more particularly to the process and composition of material employed in providing the plates with the active material, or material to become active, and especially to the manufacture of the paste or material to become active which is employed in lead-batteries.

Generally stated, the object of my invention is the provision of an improved and highly efficient paste or material to become active for lead batteries, and of an improved and highly efficient process for producing the same.

A special object is to provide an improved process and composition of material whereby the said paste or material to become active will be much tougher and more serviceable and of longer life than heretofore.

Another object is to provide an improved process and composition of material whereby the paste or material to become active will, if such is desired, be of greater porosity than heretofore.

It is also an object, of course, to provide certain details and features of improvement tending to increase the general efficiency of a process and composition of material of this particular character.

To the foregoing and other useful ends, my improved process and composition of material may be as follows: In preparing the paste or material to become active, first take equal parts of litharge and soft lead, and mix the same together. Or instead of litharge, red lead may be employed and combined in equal parts with the said soft lead. Again, equal parts of all three of these different oxids of lead may be mixed together, according to the particular results desired. The said soft lead is a crystalline oxid of lead, and is well known by that name by those skilled in the manufacture of glass, and by certain manufacturers of lead preparations. Besides the name soft lead, the term enamelers' lead is also sometimes employed, as this crystalline oxid of lead is employed by enamelers as well as by glass-makers. This mixture of oxid of lead is then reduced to a paste in the following manner: First take a gallon of distilled water, and to this add three and one-half pounds of sulfate of ammonia, together with one pound of acetone and one ounce—or perhaps two ounces—of acetic acid. All these ingredients should be of a pure character, as better results are obtained by having them as pure as possible. With this liquid preparation the oxid of lead, consisting of soft lead and litharge (for example), may then be reduced to a paste. A sufficient amount of the liquid is added to the oxid of lead to thoroughly wet the latter and reduce the whole to a paste of the well known general character. When prepared, this paste, of course, can be applied to a lead plate or grid in any suitable, known or approved manner.

The use of soft lead is an important feature, as it tends to increase the serviceability and life of the paste. The more of this ingredient that is employed, the greater the durability and life of the paste. It must be borne in mind, however, that the more soft lead employed, the less the current capacity of the battery. In other words, the use of this glass-makers' lead is beneficial in this respect,—that it increases the durability and life of the paste or material to become active; but, at the same time, it is not well to employ such a large proportion of this particular ingredient as will materially reduce or cut down the general current capacity of the battery when in use. Good results, however, have been obtained by employing the foregoing proportion of the different ingredients. The use of acetone with sulfate of ammonia is, I find, another beneficial expedient in the manufacture of a paste or material to become active of this character. Again, I find that the use of acetone with acetic acid gives good results, and improves the character of the paste. Still better results are obtained by employing all three of said ingredients, to wit: acetone, sulfate of ammonia, and acetic acid. It will be understood, of course, that the proportions in which all of the foregoing ingredients are mixed may be varied in accordance with the conditions or requirements of any particular case.

If it is desired to increase the porosity of the paste, or material to become active, with respect to certain kinds of work for the battery, such, for example, as a quick discharge, a sufficient quantity of carbonated lead (say about ten per cent. of the whole) may then be added to the mixture.

The kind of lead used in the manufacture of glass, and in certain enameling processes, and commonly known as enamelers' or soft lead, is, I find, best adapted for the desired purpose. That used in the manufacture of glass is often referred to as glass-makers' litharge, or glass-makers' red lead. As stated, any of these oxids of lead used in the manufacture of glass, or enameling, or other analogous processes, may be employed in the preparation of the above described paste or material to become active. I prefer, however, to use the particular oxid of lead used in the manufacture of glass of various kinds, and commonly known as glass-makers' litharge, or glass-makers' red lead. But in the following claim I have used the broad or general term, soft lead, and it will be understood that this term is used in its broadest and most comprehensive sense, and includes all of the soft leads used in enameling, in the manufacture of glass, and in analogous arts.

The use of acetone, in the manner (or substantially in the manner) herein specified, is calculated, I find, to make the paste or active material of the plate much harder and tougher, and tends to make it much more satisfactory and serviceable in use.

What I claim as my invention is:

The process of preparing a paste, or material to become active, for storage batteries, which consists in mixing a suitable quantity of soft lead and an oxid of lead, and in then reducing the same to paste form by adding a liquid preparation obtained by mixing together water and acetone, sulfate of ammonia and acetic acid.

Signed by me at Chicago, Cook county, Illinois, this 29th day of December 1904.

WILLIAM MORRISON.

Witnesses:
CLARENCE M. THORNE,
ALBERT SAUSER.